United States Patent Office 2,716,999
Patented Sept. 6, 1955

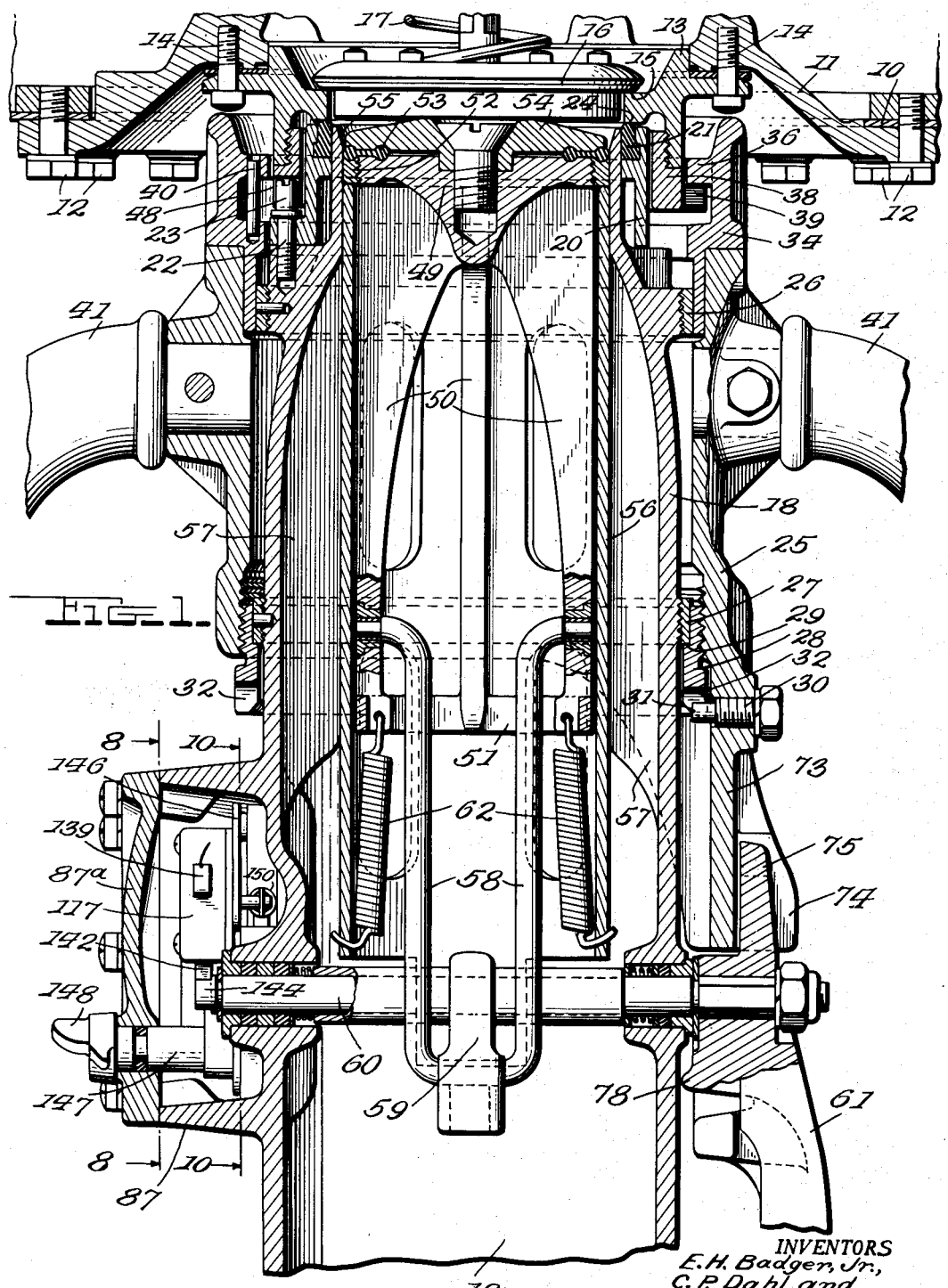

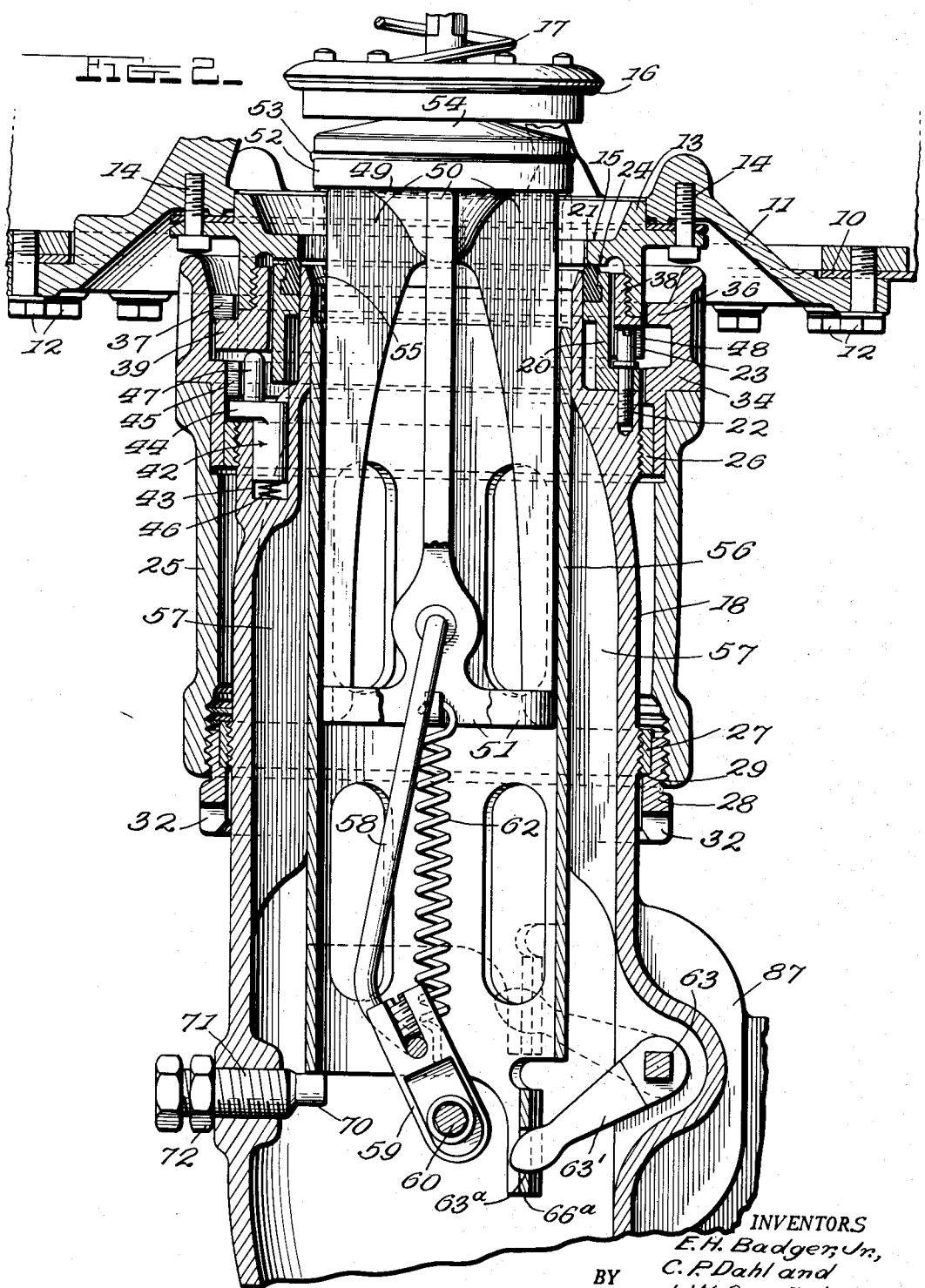

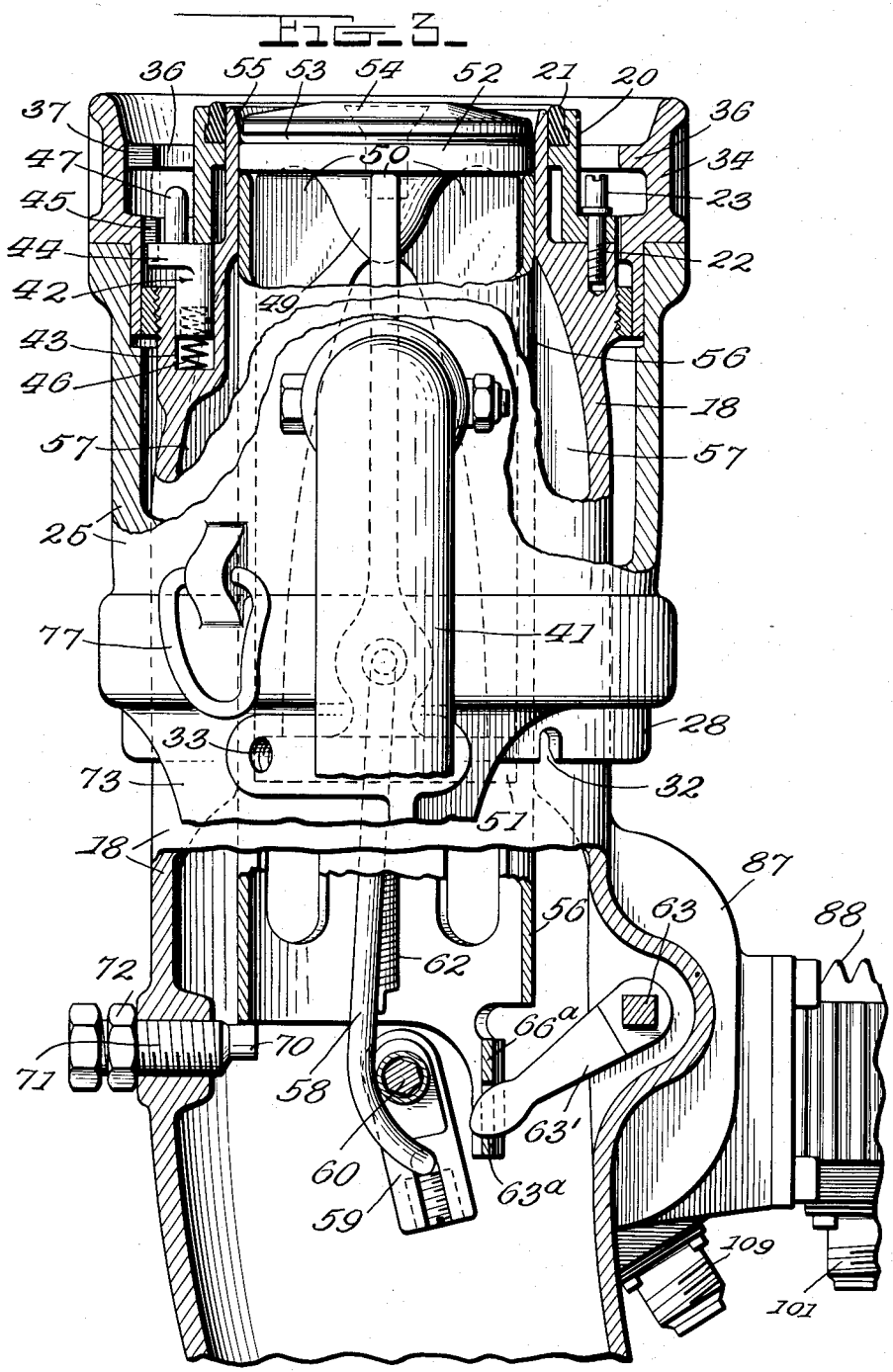

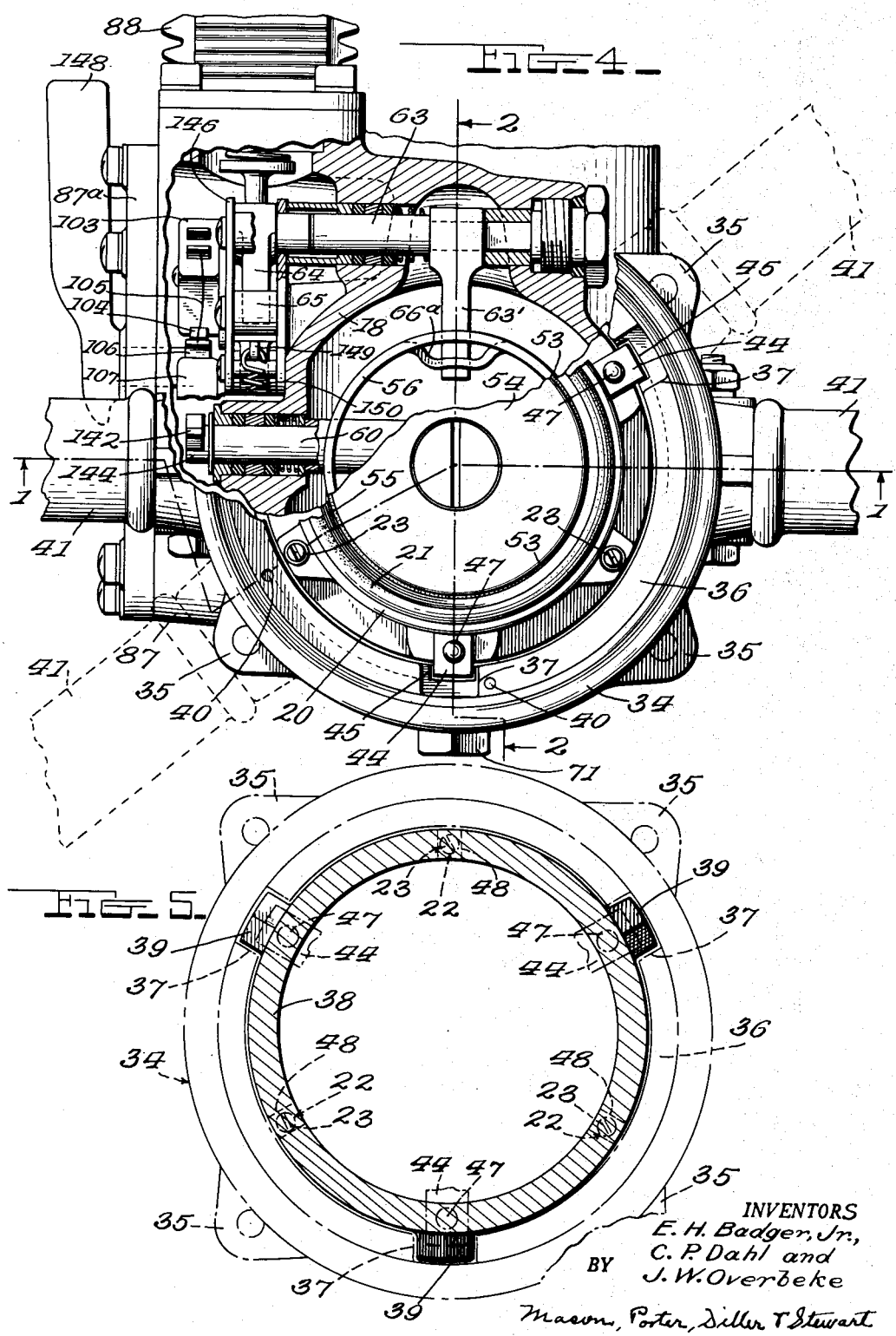

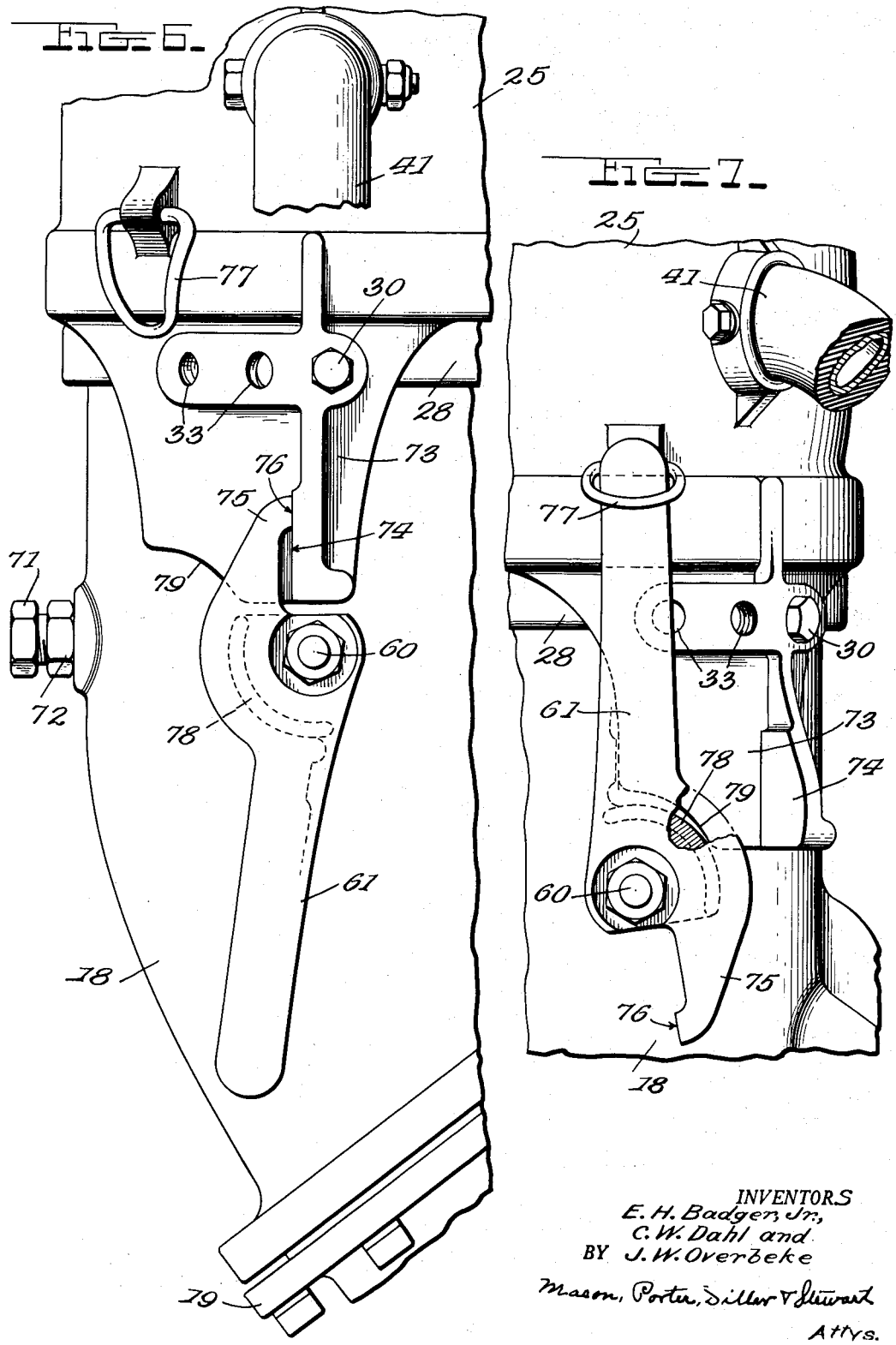

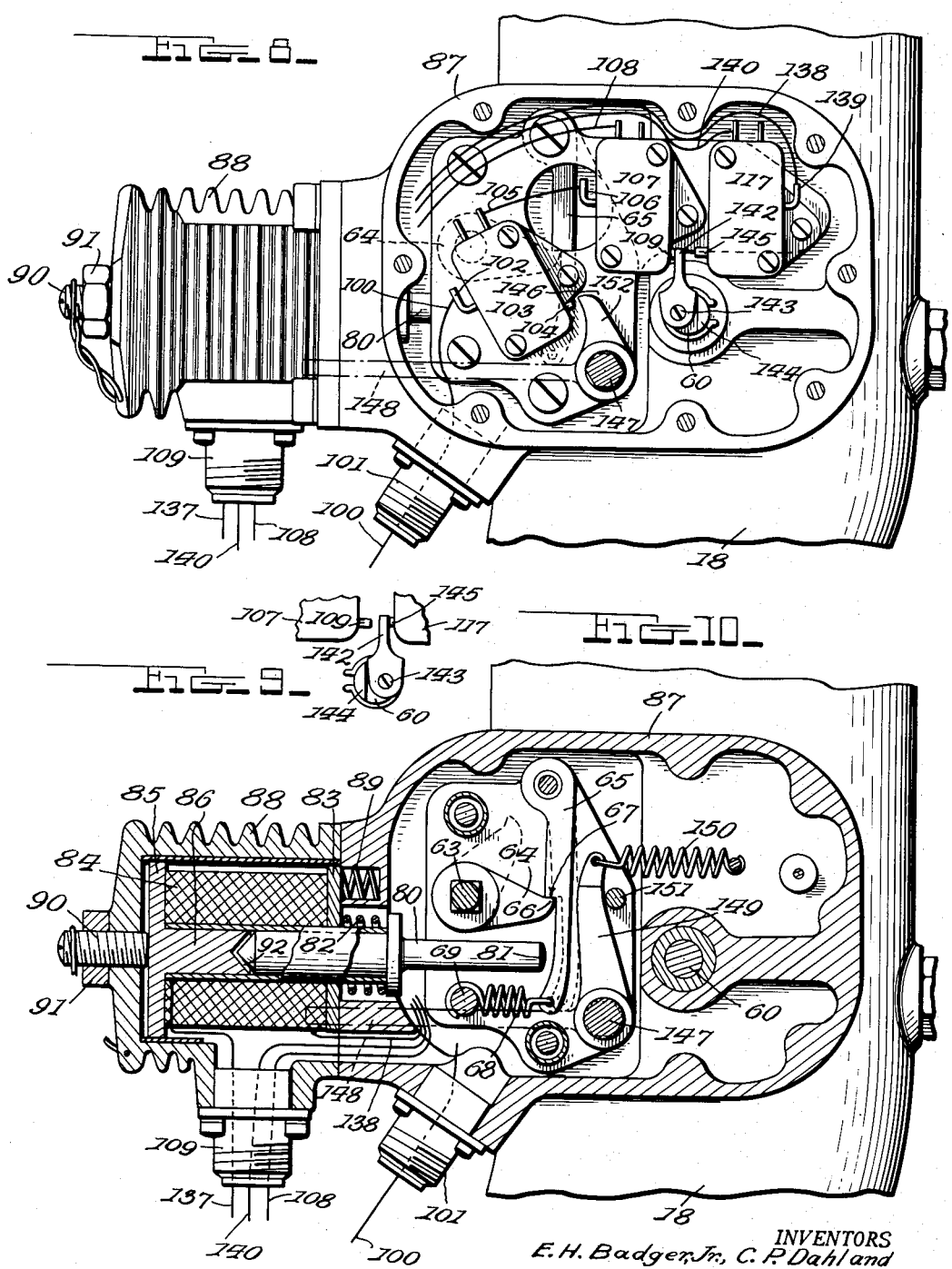

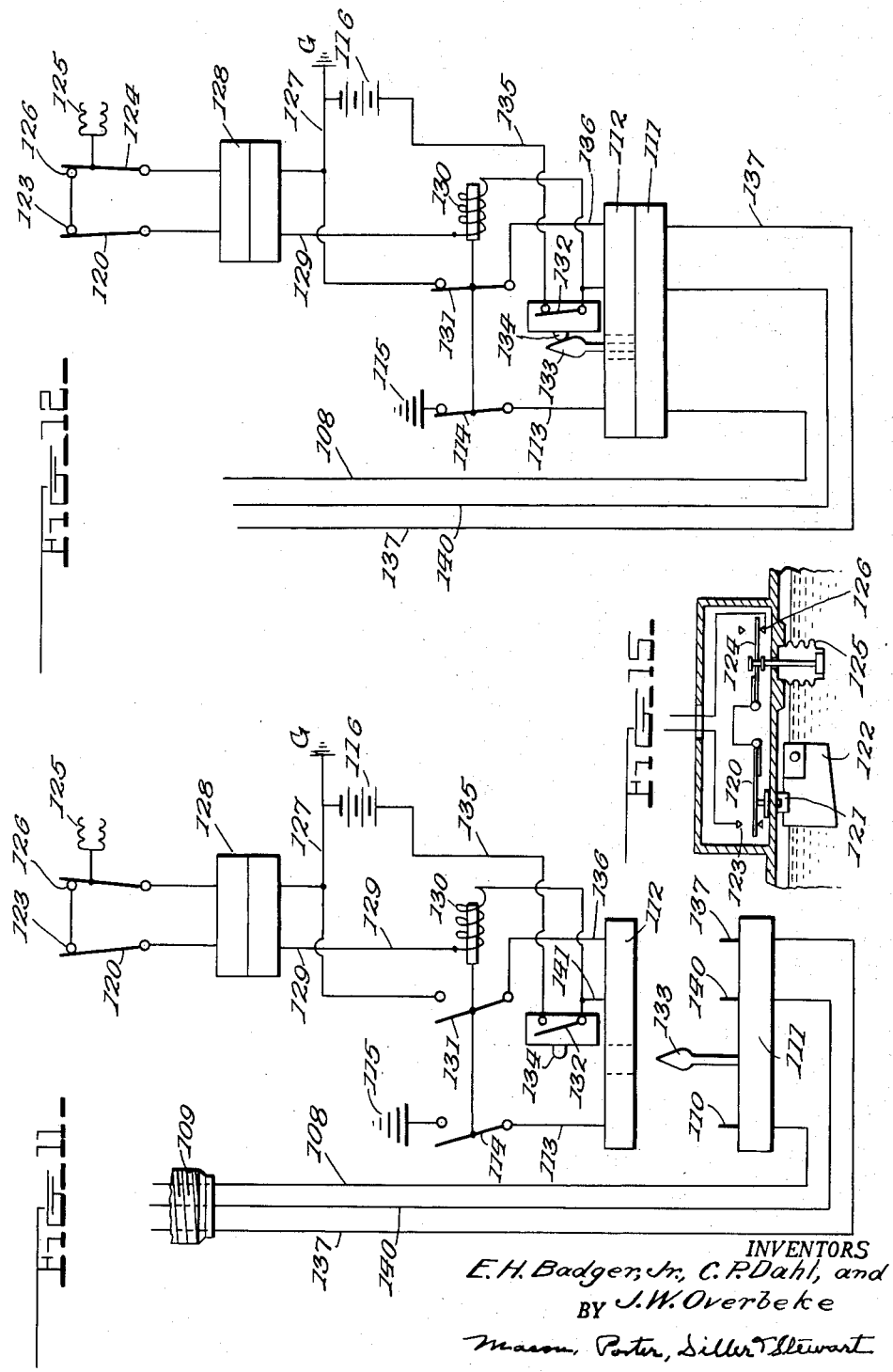

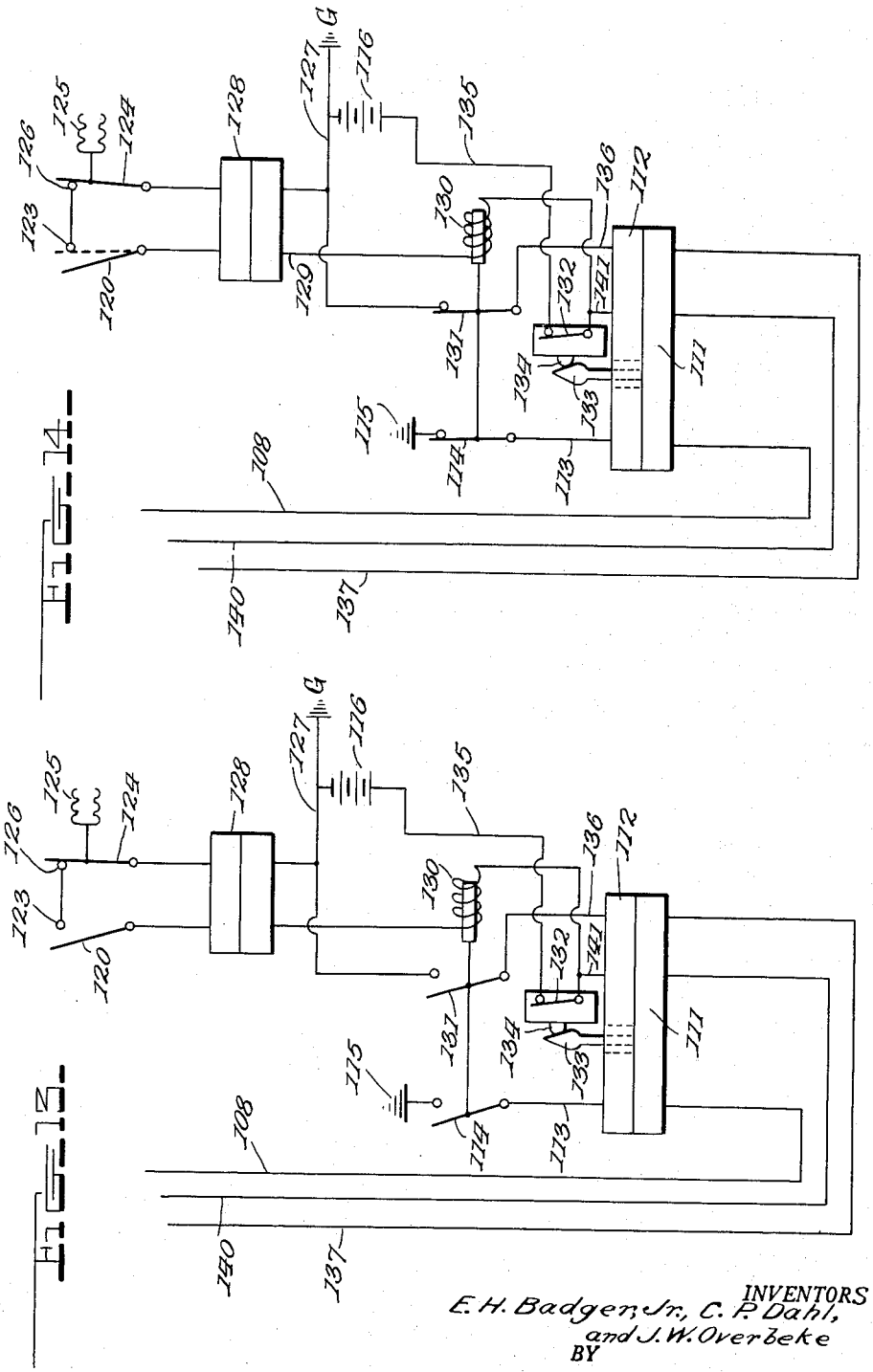

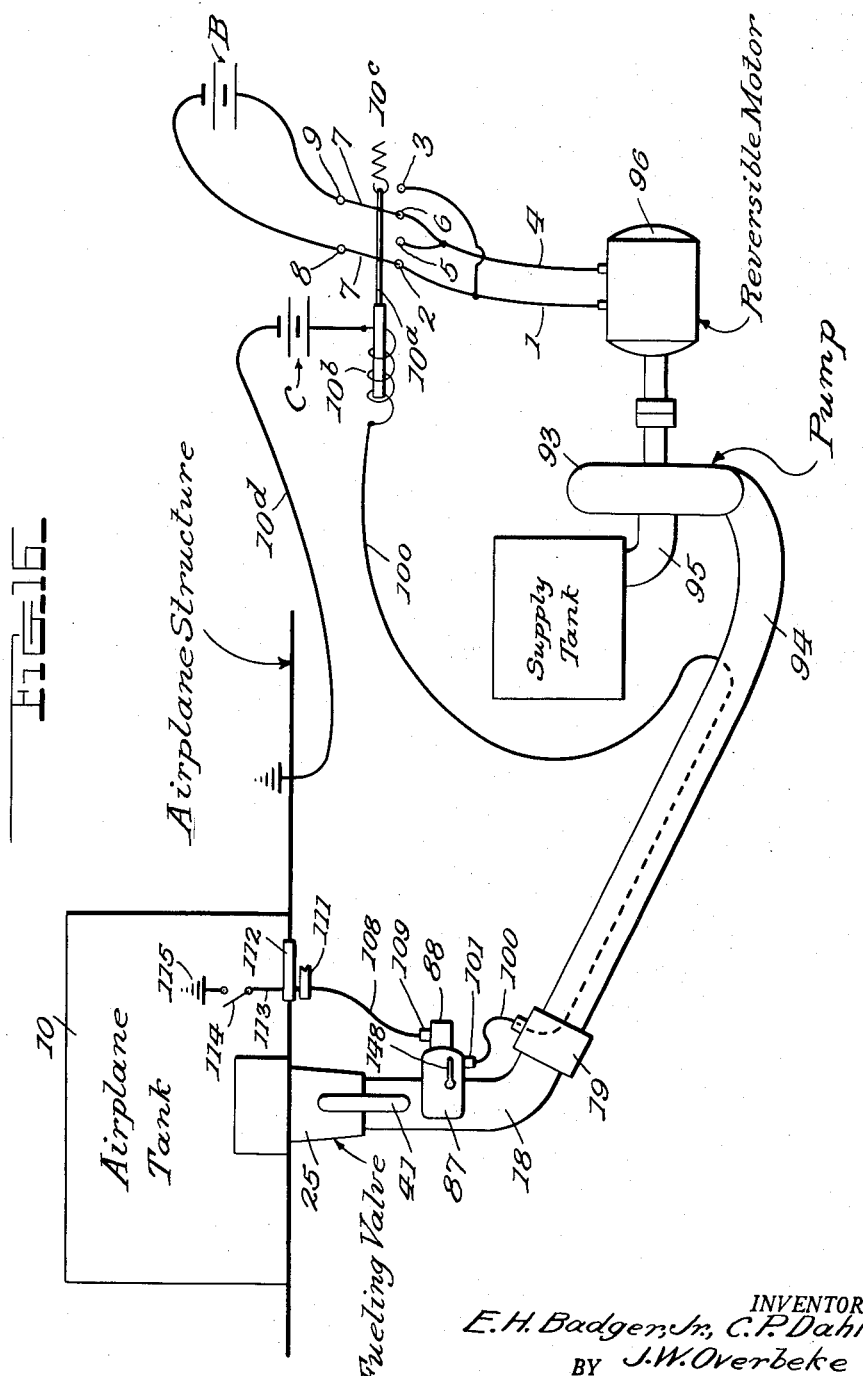

2,716,999
NOZZLE AND ASSOCIATED DEVICES FOR FUELING AND DEFUELING TANKS

Everett H. Badger, Jr., Carl P. Dahl, and John W. Overbeke, Cleveland, Ohio, assignors to The Parker Appliance Company, Cleveland, Ohio, a corporation of Ohio Application May 1, 1950, Serial No. 159,346

40 Claims. (Cl. 137—235)

This invention relates to new and useful improvements in a nozzle and associated devices for fueling or defueling tanks, and more particularly the tanks of airplanes.

An object of the invention is to provide a fueling nozzle and associated devices wherein the flow of fuel through the nozzle to the tank is controlled by a main valve disposed in the nozzle and moved manually to open position and wherein the flow of fuel through the open valve is stopped by an auxiliary valve disposed in said nozzle and controlled by the level of the fuel in the tank.

A further object of the invention is to provide a fueling device of the above type wherein the manual means for operating the main valve initiates the flow of fuel through the nozzle when the manually operated valve has been moved to open position.

Another object of the invention is to provide a fueling device of the above type wherein the auxiliary valve is moved to close the ports by springs and is held in open position by a latch released when the level of the fuel in the tank reaches a predetermined level.

A still further object of the invention is to provide a fueling device of the above type with a spring actuated plunger for releasing the latch and a solenoid which when energized withdraws the plunger and loads the spring for action.

Another object of the invention is to provide a fueling device of the above type wherein said nozzle is provided with a defueling lever and associated devices through the operation of which fuel may be withdrawn from the tank while the main valve controlled ports are open.

A still further object of the invention is to provide a locking means for the lever operating the main valve which prevents the turning of the lever until the attaching of the nozzle to the tank is completed and the detaching of the nozzle from the tank until the main valve has been moved to closed position within the nozzle.

These and other objects will in part be obvious and will in part be hereinafter more fully disclosed.

In the drawings, which show by way of illustration one embodiment of the invention:

Figure 1 is a longitudinal sectional view through the nozzle, on the line 1—1 of Figure 4, attached to a tank and embodying the improvements with the main valve in closed position;

Figure 2 is a longitudinal sectional view through the nozzle, taken on the line 2—2 of Figure 4, attached to the tank with the main valve in open position;

Figure 3 is a view partly in section and partly in side elevation of the nozzle detached and the valves in closed position;

Figure 4 is a view of the nozzle partly in end elevation and partly in section and showing in dotted lines the angle of movement of the outer sleeve of the nozzle which locks the nozzle to the tank;

Figure 5 is a sectional view through the tank sleeve showing the locking lugs carried thereby and in broken lines the nozzle ledge and openings therein through which the lugs pass when the nozzle is connected to the tank;

Figure 6 is a view in side elevation showing a portion of the nozzle and the position of the locking means which prevents operation of the handle for opening the valve until the attachment of the nozzle to the tank is completed;

Figure 7 is a view similar to Figure 6, but showing the lever in position for opening the main valve and the locking means which prevents the detaching of the nozzle while this valve is in open position;

Figure 8 is a view on the line 8—8 of Figure 1;

Figure 9 is a view on a portion of Figure 8, but showing the valve actuating shaft in a position where the valves are closed and withdrawn into the nozzle;

Figure 10 is a sectional view on the line 10—10 of Figure 1.

Figure 11 is a diagrammatic view showing the circuits for controlling the flow of fuel to or from the tank;

Figure 12 is a view similar to Figure 11, but showing the nozzle circuits plugged in and the switches closed for fueling;

Figure 13 is a view similar to Figure 12 showing the condition of the switches when the tank is filled and the flow of the tank is shut off;

Figure 14 is a view similar to Figure 11 showing the position of the circuit and switches for refueling;

Figure 15 is a view showing more or less diagrammatically the float control switch and the pressure control switch for shutting off the flow when the tank filled; and Figure 16 is a diagrammatic view showing the pump for fueling or defueling the tank and the associated control devices therefor.

The invention resides in a nozzle and associated devices for fueling tanks as for example the tank of an airplane. It is also adapted for defueling the tank. The tank is of the ordinary conventional type and is provided with an attachment plate to which the nozzle may be connected for fueling or defueling purposes. Associated with the plate is a valve seat and a spring closed valve of the usual type. The nozzle includes an inner sleeve to which a hose is connected and an outer sleeve rotatably mounted on the inner sleeve for rigidly connecting the inner sleeve to the attachment plate within the inner sleeve of the nozzle is a manually operated valve which when withdrawn into the nozzle closes the nozzle fluid tight. When, however, the valve is projected from the nozzle into the tank it will open the tank valve and expose ports in the nozzle valve through which fluid may pass into or out of the tank.

Associated with the nozzle valve is an auxiliary sleeve valve movable relative to the nozzle valve for closing or exposing the valve ports. The auxiliary valve is moved relative to the nozzle valve to close the ports by springs and is held in retracted position by a latch. The latch is released by a spring actuated plunger controlled by a solenoid which in turn is controlled by a switch associated with devices in the tank and operated when the tank is filled to a predetermined level to release the latch and permit the auxiliary valve to close the ports. Means is provided for preventing the opening of the manually controlled valve before the nozzle connection to the tank is completed and circuits are also provided controlled by the manually operating means for initiating the flow of fluid to the tank when the nozzle valve is in full open position. The means for defueling is manually controlled and retains the latch in a position for holding the auxiliary sleeve valve retracted when the nozzle valve is in open position and also causes a reverse flow of fluid from the tank.

Referring more in detail to the illustrated embodiment of the invention a tank of the conventional type is indicated at 10. This is the bottom wall of the tank and it has an opening therethrough to which an attachment plate 11 is clamped by suitable bolts 12. This attachment plate has a central opening and attached to said central opening is a valve seat carrying member 13 which is secured in sealed engagement with the attachment plate by means of bolts 14. This valve seat carrying member is provided with a valve seat 15 with which a valve 16 is adapted to make sealing engagement. This valve 16 is of the usual construction and is mounted in the tank for movements toward and away from the seat 15 and is held in engagement with the seat by means of a spring 17.

The nozzle includes an inner sleeve 18 to which a hose is attached by a suitable coupling means indicated as a whole at 19 in Figure 6 of the drawings. This inner sleeve 18 carries at its outer end a ring 20 to which a gasket 21 is connected. This ring 20 is secured to the inner sleeve by screws 22. There are three of these screws as indicated in dotted lines in Figure 5. Each screw has a cylindrical head 23, the purpose of which will be described later. The gasket 21 is adapted to be pressed against a seat 24 to make a sealed connection with the attachment plate 11.

This attaching of the inner sleeve to the plate 11 is accomplished by an outer sleeve 25. The inner sleeve carries bearing rings 26, 27, and the outer sleeve is rotatably mounted on these bearing rings. Attached to this outer sleeve 25 is a clamping ring 28, said ring has a threaded connection with the outer sleeve and it has a shoulder 29 which engages the underface of the bearing ring 27. When the outer sleeve is moved toward the attachment plate it will press the gasket 21 into sealing engagement with the seat 24. This clamping ring may be turned into or out of the sleeve for shifting the inner ring longitudinally thereof. The clamping ring is held in a set position by means of a screw 30 having a projecting inner end portion 31 adapted to engage one of the notches 32 in the clamping ring, said clamping ring has a plurality of these notches and the sleeve has a series of openings 33, 33 which are adapted to receive the screw 30. These openings are spaced at a shorter distance than the spacing of the notches and this provides for the adjusting of the clamping ring through small increments of movement and the firmly locking of the same in set position by the insertion of the screw 30.

Mounted on the outer end of the sleeve 25 is a member 34 which is secured to the sleeve by laterally projecting ears as indicated in dotted lines at 35 in Figure 5 and in full lines in Figure 4. Suitable screws pass through the ears and rigidly attach this member 34 to the outer sleeve of the nozzle. This member 34 has an inwardly projecting ledge 36 which is provided at three spaced intervals with slots therethrough as indicated at 37 in dotted lines in Figure 5 and also indicated in full lines in Figures 2, 3 and 4.

The valve seat carrying member 13 has connected thereto a sleeve 38. This sleeve 38 is provided with laterally projecting lugs 39. There are three of these lugs 39 and upper faces of the lugs are tapered. These lugs are adapted to pass through the slots 37 and when the sleeve is turned relative to the lugs, the lugs will pass underneath the ledge 36 and their tapered faces will force the sleeve towards the tank attachment and thus force the gasket carried by the inner sleeve into tight sealing contact with the seat 24. There are stop pins 40 which serve to limit the extent to which the outer sleeve can be rotated relative to the attachment plate. There are handle members 41, 41 attached to the outer sleeve for rotating the same.

When the nozzle is detached from the tank the outer sleeve is locked from rotation on the inner sleeve. This is accomplished by three dogs 42, one of which is illustrated in Figures 2 and 3. These dogs 42 are mounted in recesses 43 formed in the inner sleeve. Each dog has a holding lug 44 adapted to engage a notch 45 in an inwardly projecting portion of the outer sleeve member 34. There is a spring 46 which normally presses the dog upwardly as viewed in Figure 3 until it engages the notch 45. Each dog has a projecting pin 47. When the nozzle is placed on the tank attachment these pins 47 engage the underface of the sleeve 38 and this will cause the dogs to be moved out of the notches 45 and release the outer sleeve so that it may be turned relative to the inner sleeve.

The cylindrical heads 23 of the screws 22 are adapted to engage notches 48 in the sleeve 38 and this will prevent the inner sleeve from turning when it is being attached to the tank.

From the above description it will be apparent that a nozzle attachment has been provided consisting of inner and outer sleeves which are locked together and held from rotation one on the other when the nozzle is detached from the tank. When the inner sleeve is placed for attachment to the tank this connection between the inner sleeve and outer sleeve is released so that the outer sleeve can be turned, and means is also provided for holding the inner sleeve from turning during the rotation of the outer sleeve for drawing the inner sleeve into tight sealed contact with the attachment plate of the tank.

Mounted within the nozzle is a nozzle valve which includes a head 49 at the outer end thereof and spaced radial ribs 50, 50 which extend inwardly into the nozzle and are connected by a ring member 51. Attached to the valve head 49 is a ring 52 having a gasket seat at its upper face and a valve seat at its lower face. A gasket 53 is clamped against the valve head 49 by a cap 54. The gasket is so dimensioned that when the valve is in the position shown in Figure 1 it will contact with the inner face of the inner sleeve and make a tight seal for closing the nozzle. The sleeve has a tapered portion 55 which facilitates the passing of the gasket into the inner sleeve.

Surrounding this manually operated valve is a sleeve valve 56. The inner sleeve has a cylindrical portion at its outer end with which this auxiliary valve sleeve makes contact. It also has projecting radial ribs 57 which further support the auxiliary sleeve valve 56 in its endwise movements. The outer end of this sleeve engages the valve seat on the inner face of the ring 52. The ribs 50 of the manually operated valve contact with the inner face of the auxiliary sleeve valve and this aids in guiding the manually operated valve when it is moved from closed to open position.

This manually operated valve is moved by means of a U-shaped link 58 which is pivotally connected to diametrically opposed ribs 50 on the valve. This connection between the links and the valve is a pivotal connection so that the link is free to swing thereon. The link at its outer end is connected to a crank 59 on a shaft 60 which is mounted for oscillation in the inner sleeve of the nozzle. The bearings for the shaft have suitable packing so that fluid passing through the nozzle will not leak out through the bearings. This operating shaft 60 is provided with a handle 61 by which the shaft may be turned so as to move the valve connected thereto from closed position as shown in Figure 1 to open position as shown in Figure 2. When the valve is in closed position the pivotal connection of the link 58 to the crank 59 moves slightly past a line passing through the axis of the operating shaft and the pivotal points of connection of the link to the valve. This aids in holding the valve in closed position.

The auxiliary valve sleeve is retracted by heavy springs 62, 62 which are connected at one end to the ring member 51 forming a part of the manually operated valve and they are connected at their other ends to the sleeve valve so that the springs are constantly urging the sleeve valve outwardly into contact with the valve seat on the ring 52.

Pivotally mounted on a shaft 63 is in an arm 63' which extends into an opening 63a in an extension 66a at the lower end of the sleeve valve. The shaft 63 at its outer end carries an arm 64 with which a latch member 65 cooperates (see Figure 10). When the auxiliary sleeve valve is retracted the tooth 66 on the arm 64 engages a shoulder 67 and this will lock the inner sleeve in its retracted position. The spring 68 pivoted at one end to the latch and at its other end to a pillar 69 serves to hold the latch in the full line position shown in Figure 10 with the shoulder on the latch in engagement with the tooth on the arm 64. When this latch is released then the arm 64 can move to the dotted line position shown in Figure 10.

After the nozzle has been attached to the tank and it is desired to fill the tank with fuel the handle 61 is turned so as to cause the link 58 to move the main valve from the position shown in Figure 1 to the position shown in Figure 2. At this time the latch is holding the shaft 63 from turning and the auxiliary sleeve valve will remain in retracted position. The valve head and the ring 52 carried thereby will move away from the end of the auxiliary valve sleeve and this will provide ports through which the fuel passing into the nozzle will pass outwardly into the tank. Inasmuch as the valve head is mounted on the radially spaced ribs this makes a free port passage from the center of the nozzle outwardly between the ribs into the tank. When the tank is filled to a predetermined level the latch 65 is automatically released by mechanism later to be described and this will permit the springs to quickly move the sleeve valve outward into contact with the seat on the inner face of the ring 52 and this will close the ports leading to the tank and shut off further supply of fuel to the tank. This inner sleeve valve will remain in contact with the seat on the head of the manually controlled valve so that when the manually controlled valve is returned to closed position as shown in Figure 1 the inner sleeve valve will be retracted to latching position.

When the inner sleeve valve is retracted it will contact with a stop 70 and this will prevent any further inward movement of the two valves. This stop 70 is in the form of a pin mounted eccentrically on the end of a screw 71 which may be adjusted and locked in adjusted positions by lock nut 72. This stop may be adjusted to different setting positions and will determine the extent to which the pivotal connection between the links 58 and the crank arm 59 are moved past the dead center line which retains the valve members in their closed position.

Provision is provided so that the handle 61 can not be turned to open the valve to any extent whatever until the outer sleeve has been turned to a point where the inner sleeve is firmly pressed into sealing engagement with the attachment plate of the tank. This is accomplished by providing the depending bracket 73 carried by the outer sleeve with a shoulder 74. The handle 61 has an extension 75 provided with a flat end portion 76 which engages the shoulder 74 and prevents any turning of the handle 61 in a clockwise direction as viewed in Figure 6 until this outer sleeve with the depending bracket has moved away from its initial position to the position shown in Figure 7. The screw 30 above described is mounted in this bracket 73. Also mounted on the sleeve is a keeper ring 77 which can be moved over the end of the handle 61 when the valve has been moved to open position so as to hold the valve in this position during the filling operation. By the arrangement just described the manually controlled valve cannot be moved to open position to expose the ports leading from the nozzle into the tank until this outer sleeve has been turned so as to complete the connection between the inner sleeve and the tank.

The handle 61 is provided with a segmental flange 78. On the bracket 73 is a similar curved segmental shoulder 79. When the outer sleeve is in the position shown in Figure 7 this segmental flange 78 will lie in the path of rotation of the shoulder 79 and prevent the turning of the outer sleeve while the manually controlled valve is in open position. It is only when the handle has been turned to completely close the valves that this flange 78 moves to the position shown in Figure 6 and this will free the bracket 73 so that the outer sleeve may be turned for releasing the nozzle from the tank.

As has already been stated, the auxiliary valve normally is in retracted position and held in this retracted position by the latch 65. When this latch is released then the auxiliary sleeve valve will be moved by the springs so as to close the ports. The releasing of the latch is accomplished by means of a spring actuated plunger 80. This plunger at its free end 81 lies close to but spaced away from the latch when it is retracted so that the latch is free to be moved by the spring 68 into position for engagement with the arm 64. The spring 82 engages a shoulder on the plunger and also the end member 83 of a solenoid 84. The plunger extends into the solenoid and forms a part of the core of the solenoid. At the other end of the solenoid is a member 85 which carries a fixed section 86 of the core. The latch mechanism is mounted in a housing 87 which is formed as an integral part with the inner sleeve and the solenoid is mounted in an extension 88 of the housing. The inner member 83 of the solenoid engages a spring 89 and the outer member 85 of the solenoid is engaged by an adjustable screw 90 held in adjusted position by a lock nut 91. When the solenoid is energized the plunger 80 will be drawn into the solenoid and this will compress or load the spring 82. As long as the solenoid is energized the plunger will be held in this retracted position. When, however, the solenoid is de-energized the spring will at once quickly force the plunger outwardly from the solenoid and the end 81 of the plunger will contact the latch and move the same in a counter-clockwise direction and this releases the arm 64. The inner end 92 of the core member 86 serves as a stop for the retracted position of the plunger. By means of the springs 89 and the adjusting screw 90 and locknut 91 the position of the solenoid 84, and hence of the core member 86, may be adjusted so that the retracted position of the plunger may in turn be adjusted with respect to the latch 65. When the plunger is in released position, the spring 82 will be free from compression and the latch will be returned to the full line position in Figure 10 by the spring 68. The arm when turned in a clockwise direction, by retraction of the sleeve valve, will move the latch and pass the shoulder so as to contact therewith when the manually operated valve moves to open position and puts the springs 62 under tension.

In Figure 16 there is shown diagrammatically a fueling or defueling pump and its associated control devices. The pump is indicated at 93 and is connected to a hose 94 leading to the nozzle. It is also connected through a hose 95 to a supply tank. This pump is of the usual rotary type and when turned in one direction it will supply fuel to the hose 94 from the supply tank and when turned in the other direction it will create suction on the hose 94 and draw fuel from the tank when the valves are opened for this purpose. The pump is driven by the ordinary reversible motor 96.

A lead 1 from the motor connects with terminals 2 and 3 while the lead 4 from the motor is connected to terminals 5 and 6. There is a switch 7 connected to an intake terminal 8 that is shiftable to the terminal 5 and there is a similar switch 7 connected to the intake terminal 9 which will be shifted from the terminal 6 to the terminal 3. These intake terminals 8 and 9 are connected through suitable lines to the battery B.

When the switches are thrown to the position shown diagrammatically in Figure 16 the motor will be operated in one direction and when they are shifted to the terminals 5 and 3 respectively then the motor will be operated in the reverse direction. A bar 10$^a$ is connected to the switches and is shifted in one direction by a relay 10$^b$.

It is shifted in the opposite direction by a spring 10ᶜ. When this relay is energized the switches will be shifted so that the motor will operate in a direction to cause the pump to supply fuel to the tank and when it is deenergized then the spring will shift the switches so that the motor will be rotated in the opposite direction and draw fuel from the hose 94 for defueling purposes. One terminal of this relay is connected to a battery C and the battery C is grounded on the airplane by a line 10ᵈ. The other terminal of the relay is connected to the line 100 which extends through the hose and a connection 101 into the housing 87.

This line in the housing is connected to the terminal 102 of the micro switch 103. This micro switch is adjusted so that when the operating button 104 is released the micro switch will be closed. The other terminal of the micro switch 103 is connected through the line 105 to a terminal 106 of the micro switch 107. The other terminal of this micro switch is connected to a line 108. This micro switch 107 is so adjusted that it has a normal open circuit. When the button 109 is pressed upon the switch is closed. The line 108 leads from the housing through the connection 109 to a terminal member 110 carried by a plug-in bar 111 (see Fig. 11).

When this plug-in bar is connected to the bar 112 on the airplane then the line 108 is connected through the line 113 which is in turn connected to the switch 114 with a grounding 115 on the airplane. This completes a circuit from the battery C through the relay, the housing on the nozzle, to the grounding 115 on the airplane and also to the grounding through the line 10ᵈ on the airplane. As has already been noted when this circuit is established the pump will be driven in a direction which will draw fuel from the supply tank and deliver it to the tank on the airplane when the ports are open between the nozzle and the airplane tank and when this circuit is broken then the motor will be reversed through the action of the spring 10ᶜ and the pump will operate to create a suction on the hose and draw fuel from the tank for defueling purposes, when the nozzle is connected to the airplane tank and the ports are open.

The solenoid is energized by circuits leading to a battery 116 and the circuit leading from the battery to the solenoid is controlled by a micro switch 117 located in a housing 87 and a float control switch indicated diagrammatically at 120 and also a pressure sensitive switch indicated at 124. The float control switch is shown in Figure 15. This switch is located in a housing and consists of a switch arm 120 which is controlled by a magnet 121 carried by a float 122. When the tank is filled to the level indicated in this Figure 15, the magnet will be moved sufficiently close to the arm 120 so as to attract it and move it out of contact with the switch terminal 123 and this will break the circuit leading to the solenoid and deenergize the solenoid which will release the plunger 80 and cause the latch to be moved so as to release the arm 64 and the sleeve valve so as to close the ports. This float control switch is connected in series with a pressure control switch which includes a switch arm 124 which is in normally closed position as shown in Figure 15. There is a rod connected to a Sylphon bellows 125, which, when the Sylphon bellows is collapsed by pressure in the tank which is likely to damage the tank, will move the arm 124 out of contact with the terminal 126 and break the circuit leading to the solenoid. This will in turn release the latch and permit the sleeve valve to close the ports.

The circuits associated with the battery 116 include a line 127 which is connected through the junction box 128 with the switch 124 and in turn with the switch 120. This switch 120 is connected to the line 129 which operates upon a relay 130 to close the switches 131 and 114. This line 129 is connected to a switch 132 which is closed by a rod 133 carried by the plug-in bar 111. When the plug-in bar is attached to the bar on the airplane this rod passes through an opening in the bar 112 and contacts the button 134 and closes this switch 132. When the switch is closed, then a circuit is established from the battery 116 through the line 127, the line 129 and the switch to the line 135 and to the other terminal of the battery. The purpose of this circuit is to operate through the relay 130 for closing the switches 114 and 131. The battery 116 is grounded at G in the conventional manner.

When the switch 131 is closed, then the line 127 is connected to a line 136 and through the plug-in bar with the line 137 which passes through the connection member 109 and connects with one terminal of the solenoid coil 84. The other terminal of the coil 84 is connected to a line 138 which in turn is connected with one terminal 139 of the micro switch 117 (see Figure 10). The other terminal of this micro switch 117 is connected with the line 140 which passes through the connection member 109 and through the plug in bar 111 to a line 141 and this line 141 is connected through the switch 132 to the line 135 leading to the battery 116.

When the plug-in bar 111 is attached to the bar 112 on the airplane the switch 132 is closed and this establishes a circuit through the relay 130 and closes the switches 114 and 131. The switches 120 and 124 are normally closed and, therefore, a circuit is established to the solenoid through a micro switch 117 which controls the circuit so that when this micro switch is closed the solenoid will be energized and the plunger retracted. When, however, the micro switch is opened the solenoid will be deenergized and the plunger released for operating the latch 65. The micro switch is normally open and the solenoid deenergized when the valves are closed.

The plugging in of the bar 111 also establishes another circuit which is controlled by the micro switches 103 and 107 and these micro switches in turn control the reversing switches associated with the motor 96. The micro switch 103 is normally closed while the micro switch 107 is normally open and the circuit to the relay 10ᵇ is broken and, therefore, the reversing switches will be set so that if the pump is in operation the hose leading to the nozzle will be put under suction. The shaft 60 extends through the wall of the inner sleeve of the nozzle into the housing 87. Mounted on the end of said shaft is an arm 142. Said arm is loosely pivoted at 143 to the end of the shaft. This pivotal mounting is eccentric to the axis of the shaft. On the end of the shaft is a segment projection 144 which lies in the same plane as the supporting base of the arm 142. When the parts are in position shown in Figure 9 the shaft has been turned to the position shown in Figure 3, and the valve is closed. At this time the segment bearing against the arm forces it against the button 145 of the micro switch 117 and this will open the switch and break the circuit leading to the solenoid. At this time the manually operated valve is closed. Likewise the auxiliary sleeve valve is retracted and the arm 64 is in position to engage the shoulder 67. This is the condition of the circuits when the nozzle is disconnected from the tank. After the nozzle has been connected to the tank so as to release the handle 61 then the shaft may be turned to the position shown in Figure 2 which will move the manually operated valve through the attachment plate into contact with the tank valve and open the tank valve and also provide uncovered ports through which the fuel may flow into the tank. During the first part of the turning movement of the shaft 60 the arm 142 will be released from pressure on the button 145 and the micro switch 117 will automatically close, thus establishing a circuit through the solenoid which will retract the plunger 80. When this shaft 60 is turned so that the valve is approaching the open position and the ports are exposed, the arm 142 contacts with the button 109 and closes the micro switch 107. This will establish a circuit through the relay mechanism associated with the pump and cause the switches 7 to be shifted so that the pump will discharge fuel into the hose and from the hose through the nozzle into the tank.

When the tank is filled to a predetermined level either the switch 120 or 124 is thrown to open position and this will break the circuit through the relay 130 and when the relay is deenergized then the switches 114 and 131 will be moved to open position. The opening of the switch 131 breaks the circuit leading to the solenoid and this permits the plunger to release the latch and the sleeve valve to move outward and enclose the ports. At the same time the switch 114 is opened and this breaks the circuit leading to the relay 10$^b$ controlling the reversing switch and the spring 10$^c$ will shift the reversing switch and cause the pump to stop delivering fuel to the nozzle.

Figure 11 of the drawings shows the condition of the circuit and the switches when the nozzle is detached and it is desired to connect the nozzle to the tank for fueling purposes. Preferably before the nozzle is attached, the plug-in bar 111 is inserted in the bar 112 associated with the airplane. The line 10$^d$ is also connected to the airplane so that the battery C is grounded in the airplane. When the bar 111 is plugged in it closes the switch 132 and this establishes a circuit through the relay 130 and closes the switches 114 and 131. The circuits are all connected to the micro switches in the housing 87. Inasmuch as the micro switches 107 and 117 are both open, neither the coil 84 will be energized, nor will the circuit connected to the relay 10$^b$ at the pump be established. When the connection of the nozzle to the tank is completed by the turning of the outer sleeve then the handle 61 is released so that the valve can be opened. The first initial movement of the shaft for opening the valve closes the micro switch 117 and establishes a circuit to the solenoid and this retracts the plunger 80 loading the spring 82 ready for action. This opening of the manually operated valve does not in any way disturb the sleeve valve which is held by the latch 65 from movement and therefore while the springs 62 are tensioned and loaded, nevertheless, the sleeve valve remains in retracted position. The turning of the shaft for opening the manually controlled valve when the valve is at or near the end of its opening movement closes the micro switch 107. This energizes the relay 10$^b$ and the pump is operated so as to cause the fuel to be drawn from the main supply tank and delivered into the hose and through the hose into the tank on an airplane.

In Figure 13 the switch 120 controlled by the float is opened because the fuel in the tank has reached a level which through the float opened the switch. When this switch is opened then the circuit to the relay 130 is broken and both the switches 131 and 114 open. The opening of the switch 131 breaks the circuit to the solenoid and this releases the plunger and the plunger releases the latch and thus the auxiliary valve moves upward and closes the ports and at the same time, as has already been noted, the switch 114 being open will break the circuit controlling the relay at the pump and the pump will be operated so as to stop the flow to the tank and put the hose under suction. Before the nozzle can be disconnected from the tank the handle 61 must be turned in a counterclockwise direction as viewed in Figure 7 so as to close the main valve and retract the auxiliary valve to a latching position. This will unlock the sleeves so that it can be turned to disconnect the nozzle from the tank. The plug-in bar is removed from its connection to the airplane and likewise the plug-in for the grounding 10$^d$ of the circuit controlling the relay at the pump is also disconnected from the airplane. This completes the fueling of the tank in the airplane.

There are times when it is desirable to defuel the tank on the airplane, that is, withdraw the fuel from the tank. There has been added to the nozzle and its associated devices a manually operated lever and devices associated therewith which enables the fuel to be withdrawn from the tank when the tank is full or partially full or withdrawn to a partial extent. The latch mechanism and plunger are covered by a plate 146. Mounted on the outer face of this plate are the micro switches. A short shaft 147 is mounted in the plate and this shaft extends out through the cover plate 87$^a$ for the housing 87. On the outer end of the shaft is a hand lever 148. On the inner end of the shaft is an arm 149 which lies in the plane of the latch 65. A spring 150 moves the arm against the stop pin 151. When the lever 148 is depressed so as to turn the shaft 147 in a counterclockwise direction the arm 149 will be moved away from the stop pin and against the latch 65. So long as the lever 148 is held depressed the latch 65 cannot move to release the arm 64. Also mounted on this shaft 147 in front of the plate 146 is an arm 152. This arm when the lever is depressed engages the button 104 on the micro switch 103 and causes the switch to be opened and break the circuit therethrough. When it is desired to defuel the tank the nozzle is connected to the tank in the usual way by turning the outer sleeve on the inner sleeve. The bar 112 carrying terminals to the circuit is plugged in to the junction box 114. The switches in the tank are normally closed and the attachment of this plug-in bar closes the switch 132 and this closes the switches 114 and 131.

This may be the condition of the circuits when the nozzle is connected to the tank. The handle 61 when released is turned to move the manually operating valve into the tank, thus opening the tank valve and providing port connections between the nozzle and the tank. During the first portion of the movement of the shaft 60 the solenoid button 145 is released and a circuit established through the solenoid coil thus withdrawing the plunger. The auxiliary valve is held latched in its retracted position. Before turning the handle 61 and opening the manual valve, the operator depresses the handle 148. This moves the arm 149 against the latch 65 and holds it so that under no condition can the sleeve valve be released so as to close the ports. The arm 152 on the shaft 147 when turned by depressing the lever 148 will contact the button 104 and open the switch so as to break the circuit leading to the relay controlling the motor and the pump. When the circuit is broken to the relay then the pump when operated will draw the fuel from the tank into the nozzle and from the nozzle through the hose and discharge it into the main tank. It does not make any difference whether the switch in the tank is held closed or open during the defueling for the reason that the latch is locked so that the plunger cannot release it and furthermore the circuit is broken leading to the relay at the pump by the opening of the micro switch 103. It is not necessary that the battery C be grounded on the airplane during refueling as the reversing switch is operated by a spring and positioned so that the pump will create a suction on the hose and it is only when the circuit through the relay controlling the switches is energized that the pump will reverse the flow and deliver fuel to the tank. The hand lever 148 should be held down all the time during the defueling so that the latch will be locked in position which holds the auxiliary sleeve valve retracted.

It is believed that the operation of fueling and also of defueling is made clear during the description of the nozzle and the associated devices employed therewith. It is understood that many changes in the details of the invention may be made without departing from the spirit of the invention as set forth in the appended claims.

We claim:

1. A fueling system for a tank having a filling opening controlled by a spring closed valve comprising a nozzle, means for securing the nozzle to the tank, a manually operated valve disposed within the nozzle for closing the same and movable into the tank for opening the tank valve and exposing ports leading from the nozzle into the tank, means within the nozzle for closing said ports while the nozzle is in extended position, and means controlled by a predetermined condition of the fuel in the tank for causing the operation of said port closing means.

2. A fueling system for a tank having a filling opening controlled by a spring closed valve comprising a nozzle, means for securing the nozzle to the tank, a manually operated valve disposed within the nozzle for closing the same and movable into the tank for opening the tank valve and exposing ports leading from the nozzle into the tank, spring actuated means within the nozzle for closing said ports while the nozzle is extended, a latching means for holding the port closing means in the retracted position, and means controlled by a predetermined condition of the fuel in the tank for releasing said latching means.

3. A fueling system for a tank comprising a nozzle, means for securing the nozzle to the tank, a manually operated valve disposed within the nozzle for closing the same and movable into extended position for exposing ports in the nozzle, a sleeve valve within the nozzle movable relative to the manually operated valve for closing said ports while said valve is in extended position.

4. A fueling system for a tank comprising a nozzle, means for securing the nozzle to the tank, a manually operated valve disposed within the nozzle for closing the same and movable into extended position for exposing ports in the nozzle, a sleeve valve within the nozzle movable relative to the manually operated valve for closing said ports while said valve is in extended position, springs for moving said sleeve valve and a latch for holding the sleeve valve in retracted position.

5. A fueling system for a tank having a filling opening controlled by a spring closed valve comprising a nozzle, means for securing the nozzle to the tank, a manually operated valve disposed within the nozzle for closing the same and movable into the tank for opening the tank valve and exposing ports leading from the nozzle into the tank, a sleeve valve within the nozzle movable relative to the manually operated valve for closing said ports while said valve is in extended position, springs for moving said sleeve valve and a latch for holding the sleeve valve in retracted position, means controlled by the level of fuel in the tank for releasing said latch.

6. A fueling system for a tank having a filling opening controlled by a spring closed valve comprising a nozzle, means for securing the nozzle to the tank, a manually operated valve disposed within the nozzle for closing the same and movable into the tank for opening the tank valve and exposing ports leading from the nozzle into the tank, a sleeve valve within the nozzle movable relative to the manually operated valve for closing said ports while said valve is in extended position, springs for moving said sleeve valve and a latch for holding the sleeve valve in retracted position, a spring actuated plunger for releasing said latch and electrically operated means controlled by the level of fuel in the tank for releasing the plunger.

7. A fueling system for a tank having a filling opening controlled by a spring closed valve comprising a nozzle, means for securing the nozzle to the tank, a manually operated valve disposed within the nozzle for closing the same and movable into the tank for opening the tank valve and exposing ports leading from the nozzle into the tank, a sleeve valve within the nozzle movable relative to the manually operated valve for closing said ports while said valve is in extended position, springs for moving said sleeve valve and a latch for holding the sleeve valve in retracted position, a spring actuated plunger for releasing said latch, a solenoid associated with said plunger and operating when energized to hold said plunger retracted, an energizing circuit for said solenoid, a switch controlled by the level of fuel in the tank disposed in the circuit with the solenoid for breaking the circuit when the tank is filled to a predetermined level whereby the plunger is released and releases the latch so that the sleeve valve is moved for closing the ports leading from the nozzle to the tank.

8. A fueling system for a tank having a filling opening controlled by a spring closed valve comprising a nozzle, means for securing the nozzle to the tank, a manually operated valve disposed within the nozzle for closing the same and movable into the tank for opening the tank valve and exposing ports leading from the nozzle into the tank, a sleeve valve within the nozzle movable relative to the manually operated valve for closing said ports while said valve is in extended position, springs for moving said sleeve valve and a latch for holding the sleeve valve in retracted position, a spring actuated plunger for releasing said latch, a solenoid associated with said plunger and operating when energized to hold said plunger retracted, an energizing circuit for said solenoid, a float controlled switch and a pressure sensitive switch disposed in said tank and arranged in series in the circuit with the solenoid whereby when the fuel reaches a predetermined level one or the other of said tank switches will break the circuit leading to the solenoid and release the sleeve valve for closing the ports leading to the tank while the manually operated valve is still in extended position.

9. A fueling system for a tank comprising a nozzle, means for securing the nozzle to the tank, a manually operated main valve disposed within the nozzle and engageable with a valve seat in the nozzle when retracted for closing the nozzle, said valve being movable to extended position for exposing ports in the valve, an auxiliary sleeve valve slidable along said main valve into engagement with a seat on the main valve for closing said ports while said main valve is in extended position.

10. A fueling system for a tank comprising a nozzle, means for securing the nozzle to the tank, a manually operated main valve disposed within the nozzle and engageable with a valve seat in the nozzle when retracted for closing the nozzle, said valve being movable to an extended position for exposing ports in the valve, an auxiliary sleeve valve slidable along said main valve into engagement with a seat on the main valve for closing said ports while said main valve is in extended position, springs for moving said sleeve valve and a latch for holding the sleeve valve in retracted position, said main valve when retracted for closing the nozzle operating to move said sleeve valve into retracted and latched position.

11. A fueling system for a tank having a filling opening controlled by a spring closed valve comprising a nozzle, means for securing the nozzle to the tank, a manually operated main valve disposed within the nozzle and engageable with a valve seat in the nozzle when retracted for closing the nozzle, said valve being movable into the tank to open the tank valve and exposed ports leading from the nozzle into the tank, an auxiliary sleeve valve slidable along said main valve into engagement with a seat on the main valve for closing said ports while said main valve is in extended position, springs for moving said sleeve valve and a latch for holding the sleeve valve in retracted position, said main valve when retracted for closing the nozzle operating to move said sleeve valve into retracted and latched position, and means controlled by the level of the fuel in the tank for releasing said latch.

12. A fueling system for a tank having a filling opening controlled by a spring closed valve comprising a nozzle, means for securing the nozzle to the tank, a manually operated main valve disposed within the nozzle and engageable with a valve seat in the nozzle when retracted for closing the nozzle, said valve being movable into the tank to open the tank valve and exposed ports leading from the nozzle into the tank, an auxiliary sleeve valve slidable along said main valve into engagement with a seat on the main valve for closing said ports while said main valve is in extended position, springs for moving said sleeve valve and a latch for holding the sleeve valve in retracted position, said main valve when retracted for closing the nozzle operating to move said sleeve valve into retracted and latched position, a spring actuated plunger for releasing said latch, a solenoid for retracting said plunger when energized, an energizing circuit for said solenoid, a float controlled switch and a pressure sensitive switch associated with said tank, said switches being in series and in the circuit with the solenoid whereby when either of said switches are opened the solenoid will be deenergized and the sleeve valve released for closing the ports leading to the tank.

13. A fueling system for a tank comprising a nozzle, means for securing the nozzle to a tank, a main valve disposed within said nozzle and adapted to engage a seat on the nozzle for closing the nozzle, a manually operated shaft, a crank on said shaft, links for connecting the crank to said valve, said crank being disposed so that the crank and links pass dead center when the valve is closed for holding the valve in closed position.

14. A fueling system for a tank comprising a nozzle, means for securing the nozzle to a tank, a main valve disposed within said nozzle and adapted to engage a seat on the nozzle for closing the nozzle, a manually operated shaft, a crank on said shaft, links for connecting the crank to said valve, said crank being disposed so that the crank and links pass dead center when the valve is closed for holding the valve in closed position, a sleeve valve associated with said main valve and adapted to engage a seat on the main valve disposed so that when the main valve is moved to closed position the sleeve valve will be retracted and an adjustable stop adapted to be engaged by the sleeve valve for limiting the retracting movement of the main valve.

15. A fueling system for a tank comprising a nozzle, a main valve disposed in said nozzle and adapted to be moved into the tank, said main valve having a head at its outer end carrying a gasket adapted to engage the nozzle for closing the same when the valve is retracted, radially disposed ribs carrying said head and providing ports leading from the nozzle when the valve is extended, and means for closing said ports while the valve is in extended position.

16. A fueling system for a tank comprising a nozzle, a main valve disposed in said nozzle and adapted to be moved into the tank, said main valve having a head at its outer end carrying a gasket adapted to engage the nozzle for closing the same when the valve is retracted, radially disposed ribs carrying said head and providing ports leading from the nozzle when the valve is extended, and a sleeve valve mounted for movement along the ribs of the main valve and adapted to engage a valve seat on said head for closing said ports while the valve is in extended position.

17. A fueling system for a tank comprising a nozzle, a main valve disposed in said nozzle and adapted to be moved into the tank, said main valve having a head at its outer end carrying a gasket adapted to engage the nozzle for closing the same when the valve is retracted, radially disposed ribs carrying said head and providing ports leading from the nozzle when the valve is extended, a ring connecting the inner end of said ribs, a sleeve valve mounted for movement along the outer face of said ribs of the main valve, springs connecting said ring with said sleeve and a latching means for preventing the movement of the sleeve when the main valve is moved into extended position, said springs being disposed so as to be put under tension by the movement of the main valve to extended position for operating the sleeve valve when the latch is released.

18. A fueling system for a tank comprising a nozzle, a main valve disposed in said nozzle and adapted to be moved into the tank, said main valve having a head at its outer end carrying a gasket adapted to engage the nozzle for closing the same when the valve is retracted, radially disposed ribs carrying said head and providing ports leading from the nozzle when the valve is extended, a ring connecting the inner ends of said ribs, a shaft mounted in said nozzle and carrying a crank, links connecting said crank to the ring on the main valve, said links and crank being disposed so that when the valve is retracted into the nozzle the crank and links will pass dead centers and hold the valve in closed position.

19. A fueling system for a tank comprising a nozzle, a main valve disposed in said nozzle and adapted to be moved into the tank, said main valve having a head at its outer end carrying a gasket adapted to engage the nozzle for closing the same when the valve is retracted, radially disposed ribs carrying said head and providing ports leading from the nozzle when the valve is extended, a ring connecting the inner ends of said ribs, a shaft mounted in said nozzle and carrying a crank, links connecting said crank to the ring on the main valve said links and crank being disposed so that when the valve is retracted into the nozzle the crank and links will pass dead centers and hold the valve in closed position, and means for limiting the movement of the main valve into the sleeve.

20. A fueling system for tanks comprising a nozzle, the inner face of the outer end of the nozzle being tapered outwardly, a main valve disposed in said nozzle and adapted to be moved to extended position for exposing ports leading from the nozzle, said main valve having a head at the outer end thereof, a gasket seated on the outer face of said head and a cap for clamping the gasket against said head, said gasket being dimensioned so that when the valve is retracted, it will engage the tapered entrance to the nozzle and make sealing contact within the inner face of the nozzle.

21. A fueling system for a tank comprising an inner sleeve, a gasket at the outer end of said sleeve adapted to make sealing contact with the tank, an outer sleeve rotatably mounted on said inner sleeve, means associated with said outer sleeve for pressing the inner sleeve gasket into contact with the gasket seat on a tank, and means whereby the rotating position of the outer sleeve on the inner sleeve may be adjusted to take up wear in said gasket.

22. A fueling system for a tank comprising an inner sleeve adapted to be connected to the tank, an outer sleeve rotatably mounted on said inner sleeve, means cooperating with said outer sleeve for forcing the inner sleeve into sealing engagement with a tank, a main valve disposed within said inner sleeve and adapted to engage said inner sleeve for closing the same, an operating shaft mounted in said inner sleeve, means actuated thereby for moving said valve toward and from said seat on the inner sleeve, a sleeve valve associated with the main valve and adapted to engage a seat on the main valve disposed so that when said main valve is moved to closed position said sleeve valve will be retracted, a handle for operating said shaft, and means carried by said outer sleeve for preventing the rotation of said shaft for projecting the valve into the tank and exposing ports leading from the inner sleeve to the tank before the outer sleeve has been turned to complete the connection of the inner sleeve to the tank.

23. A fueling system for a tank comprising an inner sleeve adapted to be connected to the tank, an outer sleeve rotatably mounted on said inner sleeve, means cooperating with said outer sleeve for forcing the inner sleeve into sealing engagement with a tank, a main valve disposed within said inner sleeve and adapted to engage said inner sleeve for closing the same, an operating shaft mounted in said inner sleeve, means actuated thereby for moving said valve toward and from engagement with the inner sleeve, a sleeve valve associated with the main valve and adapted to engage a seat on the main valve disposed so that when said main valve is moved to closed position said sleeve valve will be retracted, a handle for operating said shaft, and means carried by said handle for preventing the turning of the outer sleeve to disconnect the inner sleeve from the tank before the valve has been moved to closed position.

24. A fueling and defueling system for a tank having a filling opening controlled by a spring closed valve comprising a nozzle, means for securing the nozzle to the tank, a main valve disposed within the nozzle for closing the same and movable into the tank for opening the tank valve and exposing the ports leading from the nozzle into the tank, manually operated means for moving said main valve, a sleeve valve within the nozzle, movable relative to the main valve for closing the ports while the main valve is in extended position, springs for moving said sleeve valve, a latch for holding the sleeve valve in retracted position, a pump connecting said nozzle with a supply tank, electrically controlled means for causing flow of fuel through the pump to the airplane tank or for withdrawing fuel therefrom, said electrically controlled means including a switch disposed on the nozzle, a manually operated defueling lever mounted on said nozzle, and devices operated thereby to hold the latch from releasing the sleeve and for operating the switch to cause flow of fuel from the airplane tank to the supply tank.

25. A fueling and defueling system for a tank having a filling opening controlled by a spring closed valve comprising a nozzle, means for securing the nozzle to the tank, a main valve disposed within the nozzle for closing the same and movable into the tank for opening the tank valve and exposing ports leading from the nozzle into the tank, manually operated means for moving said main valve, a sleeve valve within the nozzle, movable relative to the main valve for closing the ports while the main valve is in extended position, springs for moving said sleeve valve, a latch for holding the sleeve valve in retracted position, a pump connecting said nozzle with a supply tank, electrically controlled means for causing flow of fuel through the pump to the airplane tank or for withdrawing fuel therefrom, said electrically controlled means including a switch mounted on the nozzle and means actuated by the manually operated means for closing said switch for causing flow of fuel from the supply tank to the airplane tank, said electrically controlled means including a second switch on said nozzle, a manually operated defueling lever mounted on said nozzle and devices operated thereby for holding the sleeve valve in detracted position and for operating said second switch to cause a flow of fuel from the airplane tank to the supply tank.

26. A fueling system for an airplane tank having a filling opening controlled by a spring closed valve comprising a nozzle, means for securing the nozzle to the airplane tank, a manually operated valve disposed within the nozzle for closing the same and movable into the airplane tank for opening the tank valve and exposing ports leading from the nozzle into the airplane tank, a sleeve valve within the nozzle movable relative to the manually operated valve for closing said ports while said valve is in extended position, springs for moving said sleeve valve and a latch for holding the sleeve valve in retracted position, a fuel supply tank, a pump connecting the supply tank to the nozzle, electrically controlled means for causing flow of fuel through the pump to the nozzle, a spring actuated plunger for releasing said latch, a solenoid for holding said plunger retracted, and means operative when the airplane tank is full to deenergize the solenoid whereby said plunger is released and to condition said electrically controlled means to cause the pump to cease delivering fuel to the nozzle.

27. A fueling system for airplane tanks having a filling opening controlled by a spring closed valve comprising a nozzle, means for securing the nozzle to the tank, a manually operated valve disposed within the nozzle for closing the same and movable into the tank for opening the tank valve and exposing ports leading from the nozzle into the tank, a sleeve valve within the nozzle movable relative to the manually operated valve for closing said ports while said valve is in extended position, springs for moving said sleeve valve and a latch for holding the sleeve valve in retracted position, a fuel supply tank, reversible pumping means connecting the supply tank to the nozzle, an electric pump control circuit adapted when energized to cause the pump to deliver fuel to the nozzle and when deenergized to cause the pump to drain fuel from the nozzle, a spring actuated plunger for releasing said latch, a solenoid for holding said plunger retracted, and means operative when the tank is full to deenergize the solenoid whereby said plunger is released and to deenergize said electric control circuit to cause the pump to drain fuel from the nozzle.

28. A fueling system for an airplane tank having a filling opening controlled by a spring closed valve comprising a nozzle, means for securing the nozzle to the tank, a manually operated valve disposed within the nozzle for closing the same and movable into the tank for opening the tank valve and exposing ports leading from the nozzle into the tank, a sleeve valve within the nozzle movable relative to the manually operated valve for closing said ports while said valve is in extended position, springs for moving said sleeve valve and a latch for holding the sleeve valve in retracted position, a spring actuated plunger for releasing said latch, a solenoid for holding said plunger retracted, an energizing circuit for said solenoid, a fuel supply tank, a pump connecting the supply tank to the nozzle, electrically controlled means for causing said pump to deliver fuel from said supply tank to said nozzle, said electrically controlled means including a pump control circuit, a spring opened switch in the solenoid circuit and another spring opened switch in the pump control circuit, a relay circuit for controlling both said switches and operative when energized to close said switches and when deenergized to permit said switches to open, a pair of switches in said relay circuit, one controlled by the level and the other by the pressure of the fuel in the airplane tank, said pair of switches being series connected and independently operable for deenergizing the relay circuit when the airplane tank is full.

29. A fueling system for a tank having a filling opening controlled by a spring closed valve comprising a nozzle, means for securing the nozzle to the tank, a manually operated valve disposed within the nozzle for closing the same and movable into the tank for opening the tank valve and exposing ports leading from the nozzle into the tank, a sleeve valve within the nozzle movable relative to the manually operated valve for closing said ports while said valve is in extended position, springs for moving said sleeve valve and a latch for holding the sleeve valve in retracted position, a spring actuated plunger for releasing said latch, a solenoid associated with said plunger, a circuit for said solenoid operating when energized to hold said plunger retracted, the circuit for said solenoid being open when said manually operated valve is in retracted position, means associated with said manually operated valve for closing said solenoid circuit as the manually operated valve is being moved to its extended position whereby said solenoid is energized to hold said plunger retracted, a switch in the circuit with the solenoid and adapted when the tank is full to break the circuit whereby the plunger is released and releases the latch so that the sleeve valve is moved for closing the ports leading from the nozzle to the tank.

30. A fueling system for a tank having a filling opening controlled by a spring closed valve comprising a nozzle, means for securing the nozzle to the tank, a manually operated valve disposed within the nozzle for closing the same and movable into the tank for opening the tank valve and exposing ports leading from the nozzle into the tank, a sleeve valve within the nozzle movable relative to the manually operated valve for closing said ports while said valve is in extended position, springs for moving said sleeve valve and a latch for holding the sleeve valve in retracted position, a spring actuated plunger for releasing said latch, a solenoid associated with said plunger, a circuit for said solenoid operating when energized to hold said plunger retracted, a fuel supply tank, a pump, electrically controlled means for causing flow of fuel through the pump to the nozzle and thence into the airplane tank, said electrically controlled means including a control circuit, said circuit being normally open when said manually operated valve is in retracted position, means associated with said manually operated valve for closing said circuit when the manually operated valve is moved to its extended position, and means operative when said airplane tank is full for opening both the control and solenoid circuits.

31. A fueling system for an airplane tank having a filling opening controlled by a spring closed valve comprising a nozzle, means for securing the nozzle to the tank, a manually operated valve disposed within the nozzle for closing the same and movable into the tank for opening the tank valve and exposing ports leading from the nozzle into the tank, a sleeve valve within the nozzle movable relative to the manually operated valve for closing said ports while said valve is in extended position, springs for moving said sleeve valve and a latch for holding the sleeve valve in retracted position, a spring actuated plunger for releasing said latch, a solenoid associated with said plunger and operating when energized to hold said plunger retracted, a fuel supply tank, a pump, electrically controlled means for causing flow of fuel through the pump to the nozzle and thence into said airplane tank, said electrically controlled means including a control circuit, both the solenoid and control circuits being open when the manually operated valve is in retracted position, means associated with said manually operated valve for first closing the solenoid circuit and then closing the control circuit as the manually operated valve is moved to its extended position, and means operative when the airplane tank is full for opening both the control and solenoid circuits.

32. A fueling system for an airplane tank having a filling opening controlled by a spring closed valve comprising a nozzle, means for securing the nozzle to the tank, a manually operated valve disposed within the nozzle for closing the same and movable into the tank for opening the tank valve and exposing ports leading from the nozzle into the tank, a sleeve valve within the nozzle movable relative to the manually operated valve for closing said ports while said valve is in extended position, springs for moving said sleeve valve and a latch for holding the sleeve valve in retracted position, a spring actuated plunger for releasing said latch, a solenoid associated with said plunger, a circuit for said solenoid operating when energized to hold said plunger retracted, a fuel supply tank, a pump, electrically controlled means for causing flow of fuel through the pump to the nozzle and thence into the airplane tank, said means including a control circuit, both the solenoid and control circuits being open when the manually operated valve is in retracted position, means associated with said manually operated valve for first closing the solenoid circuit and then closing the control circuit as the manually operated valve is moved to its extended position, said solenoid and control circuits each having a switch controlled by a common relay circuit, and means for breaking said relay circuit when the tank is full to cause said switches to be opened.

33. A fueling system for a tank having a filling opening controlled by a spring closed valve comprising a nozzle, means for securing the nozzle to the tank, a manually operated valve disposed within the nozzle for closing the same and movable into the tank for opening the tank valve and exposing ports leading from the nozzle into the tank, a sleeve valve within the nozzle movable relative to the manually operated valve for closing said ports while said valve is in extended position, springs for moving said sleeve valve and a latch for holding the sleeve valve in retracted position, a spring actuated plunger for releasing said latch, a solenoid associated with said plunger, a circuit for said solenoid operating when energized to hold said plunger retracted, a fuel supply tank, a pump, electrically controlled means for causing flow of fuel through the pump to the nozzle and thence into the airplane tank, said electrically controlled means including a control circuit, a pair of switches, one in the solenoid circuit and the other in the control circuit and both open when the manually operated valve is in retracted position, switch operating means associated with said manually operated valve for closing both switches as said manually operated valve is moved to extended position, said solenoid and control circuits each having a second switch controlled by a common relay circuit, means for breaking said relay circuit when the tank is full to cause both said second switches to open, and said switch operating means being operative during retraction of the manually operated valve for opening said pair of switches.

34. A fueling system for an airplane tank having a filling opening controlled by a spring closed valve comprising a nozzle, means for securing the nozzle to the tank, a manually operated valve disposed within the nozzle for closing the same and movable into the tank for opening the tank valve and exposing ports leading from the nozzle into the tank, a sleeve valve within the nozzle movable relative to the manually operated valve for closing said ports while said valve is in extended position, springs for moving said sleeve valve and a latch for holding the sleeve valve in retracted position, a fuel supply tank, reversible pumping means connecting the supply tank to the nozzle for delivering fuel to or draining it from said nozzle, electrically controlled means for controlling the direction of the pump output, said electrically controlled means including a control circuit adapted when energized to cause the pumping means to deliver fuel to the nozzle and when deenergized to cause the pumping means to drain the nozzle, a spring actuated plunger for releasing said latch, a solenoid for holding said plunger retracted, an energizing circuit for said solenoid, and means operative when the airplane tank is full for deenergizing both the solenoid and control circuits whereby the solenoid plunger will be released and releases the latch to permit the sleeve valve to close against said manually operated valve and whereby the pump output is reversed for draining fuel from the nozzle.

35. A fueling system for an airplane tank having a filling opening controlled by a spring closed valve comprising a nozzle, means for securing the nozzle to the tank, a manually operated valve disposed within the nozzle for closing the same and movable into the tank for opening the tank valve and exposing ports leading from the nozzle into the tank, a sleeve valve within the nozzle movable relative to the manually operated valve for closing said ports while said valve is in extended position, springs for moving said sleeve valve and a latch for holding the sleeve valve in retracted position, a spring acuated plunger, a solenoid, an energizing circuit therefor, said solenoid operating to retract said plunger, a fuel supply tank, reversible pumping means connecting the supply tank to the nozzle for delivering fuel to or draining it from said nozzle, electrically controlled means for controlling the direction of the pump output, said electrically controlled means including a control circuit adapted when energized to cause the pumping means to deliver fuel to the nozzle and when deenergized to cause the pumping means to drain the nozzle, said control circuit and the solenoid circuit being open when the manually operated valve is in retracted position, means associated with said manually operated valve for closing both said circuits as the manually operated valve is moved to extended position whereby said solenoid plunger will be held in retracted position and said pumping means will deliver fuel to the nozzle, and means operative when the airplane tank is full for opening both the relay and solenoid circuits whereby the solenoid plunger will be released and releases the latch to permit the sleeve valve to close against said manually operated valve and whereby the pumping means is caused to drain the nozzle.

36. A fueling system for an airplane tank having a filling opening controlled by a spring closed valve comprising a nozzle, means for securing the nozzle to the tank, a manually operated valve disposed within the nozzle for closing the same and movable into the tank for opening the tank valve and exposing ports leading from the nozzle into the tank, a sleeve valve within the nozzle movable relative to the manually operated valve for closing said ports while said valve is in extended position, springs for moving said sleeve valve and a latch for holding the sleeve valve in retracted position, a fuel supply tank, a reversible pump connecting the supply tank to the nozzle for delivering fuel to or draining it from said nozzle, a reversible electric motor for driving said pump in either direction, an electric control circuit for said motor adapted when energized to cause the motor to operate the pump in a direction for delivering fuel to the nozzle and when de-energized to cause the motor to operate the pump in a direction for draining the nozzle, a spring actuated plunger for releasing said latch, a solenoid for holding said plunger retracted, and means operative when the airplane tank is full for deenergizing both the solenoid and said electric control circuit.

37. A fueling system for an airplane tank having a filling opening controlled by a spring closed valve comprising a nozzle, means for securing the nozzle to the tank, a manually operated valve disposed within the nozzle for closing the same and movable into the tank for opening the tank valve and exposing ports leading from the nozzle into the tank, a sleeve valve within the nozzle movable relative to the manually operated valve for closing said ports while said valve is in extended position, springs for moving said sleeve valve and a latch for holding the sleeve valve in retracted position, a spring actuated plunger, a solenoid, an energizing circuit therefor, said solenoid operating to retract said plunger, a fuel supply tank, a reversible pump connecting the supply tank to the nozzle for delivering fuel to or draining it from said nozzle, a reversible electric motor for driving said pump in either direction, and electric control circuits for said motor adapted when energized to cause the motor to operate the pump in a direction for delivering fuel to the nozzle and when deenergized to cause the motor to operate the pump in a direction for draining the nozzle, a spring actuated plunger for releasing said latch, a solenoid for holding said plunger retracted, said solenoid and control circuits each having a switch controlled by a common relay circuit, and means for automatically breaking said relay circuit when the tank is full to cause said switches to be opened.

38. A fueling system for an airplane tank having a filling opening controlled by a spring closed valve comprising a nozzle, means for securing the nozzle to the tank, a manually operated valve disposed within the nozzle for closing the same and movable into the tank for opening the tank valve and exposing ports leading from the nozzle into the tank, a sleeve valve within the nozzle movable relative to the manually operated valve for closing said ports while said valve is in extended position, springs for moving said sleeve valve and a latch for holding the sleeve valve in retracted position, a spring actuated plunger for releasing said latch, a solenoid associated with said plunger, a circuit for said solenoid operating when energized to hold said plunger retracted, a fuel supply tank, a pump, electrically controlled means for causing flow of fuel through the pump to the nozzle and thence into the airplane tank, said electrically controlled means including a control circuit, both the solenoid and control circuits being open when the manually operated valve is in retracted position, means associated with said manually operated valve for first closing the solenoid circuit and then closing the control circuit as the manually operated valve is moved to its extended position, said solenoid and control circuits each having a switch controlled by a common relay circuit in the airplane, a normally open switch in said relay circuit, a plug-in connection between the circuits in the nozzle and the circuits in the airplane, means for automatically closing said relay circuit switch when the plug-in connection is made, and means for breaking said relay circuit when the tank is full to cause said solenoid and control circuit switches to be opened.

39. A fueling system for a tank having a filling opening controlled by a spring closed valve comprising a nozzle, means for securing the nozzle to the tank, a manually operated valve disposed within the nozzle for closing the same and movable into the tank for opening the tank valve and exposing ports leading from the nozzle into the tank, a sleeve valve within the nozzle movable relative to the manually operated valve for closing said ports while said valve is in extended position, springs for moving said sleeve valve and a latch for holding the sleeve valve in retracted position, a spring actuated plunger for releasing said latch, a solenoid associated with said plunger, a circuit for said solenoid operating when energized to hold said plunger retracted, a switch controlled by the level of fuel in the tank disposed in the circuit with the solenoid for breaking the circuit when the tank is filled to a predetermined level whereby the plunger is released and releases the latch so that the sleeve valve is moved for closing the ports leading from the nozzle to the tank, and means for adjusting the operating position of said plunger with respect to said latch.

40. A fueling system for a tank having a filling opening controlled by a spring closed valve comprising a nozzle, means for securing the nozzle to the tank, a manually operated valve disposed within the nozzle for closing the same and movable into the tank for opening the tank valve and exposing ports leading from the nozzle into the tank, a sleeve valve within the nozzle movable relative to the manually operated valve for closing said ports while said valve is in extended position, springs for moving said sleeve valve and a latch for holding the sleeve valve in retracted position, a spring actuated plunger for releasing said latch, a solenoid associated with said plunger, a circuit for said solenoid operating when energized to hold said plunger retracted, a switch controlled by the level of fuel in the tank disposed in the circuit with the solenoid for breaking the circuit when the tank is filled to a predetermined level whereby the plunger is released and releases the latch so that the sleeve valve is moved for closing the ports leading from the nozzle to the tank, said solenoid providing a stop for the retracted position of said plunger, and means for adjusting the position of said stop by adjusting the position of said solenoid.

References Cited in the file of this patent

UNITED STATES PATENTS

| | | |
|---|---|---|
| 1,272,595 | Peck | July 16, 1918 |
| 1,395,551 | Brand | Nov. 1, 1921 |
| 1,477,244 | Collins | Dec. 11, 1923 |
| 1,531,406 | Meunier | Mar. 31, 1925 |
| 1,911,987 | Casey | May 30, 1933 |
| 2,384,628 | Krone | Sept. 11, 1945 |
| 2,461,312 | Dahlem | Feb. 8, 1949 |
| 2,477,186 | Koehler | July 26, 1949 |
| 2,519,358 | Davies | Aug. 22, 1950 |